(12) United States Patent
Tang et al.

(10) Patent No.: US 11,014,820 B2
(45) Date of Patent: May 25, 2021

(54) MOLECULAR SIEVE, PREPARATION THEREOF AND ACOUSTIC ABSORPTION MATERIAL AND SPEAKER CONTAINING THE SAME

(71) Applicant: AAC Technologies Pte. Ltd., Singapore (SG)

(72) Inventors: Kun Tang, Shenzhen (CN); Hezhi Wang, Shenzhen (CN); Hongshu Feng, Shenzhen (CN); Guochuang Huang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/236,543

(22) Filed: Dec. 30, 2018

(65) Prior Publication Data
US 2019/0202706 A1    Jul. 4, 2019

(30) Foreign Application Priority Data

Jan. 4, 2018 (CN) .......................... 201810006518.4
Jan. 17, 2018 (CN) .......................... 201810044489.0
Jan. 17, 2018 (CN) .......................... 201810044834.0

(51) Int. Cl.

| | |
|---|---|
| *B01J 20/18* | (2006.01) |
| *C01B 39/48* | (2006.01) |
| *C01B 39/00* | (2006.01) |
| *H04R 1/28* | (2006.01) |
| *H04R 1/02* | (2006.01) |
| *B01J 29/86* | (2006.01) |
| *B01J 29/87* | (2006.01) |
| *B01J 29/40* | (2006.01) |
| *B01J 29/00* | (2006.01) |
| *B01J 20/28* | (2006.01) |
| *C01B 39/38* | (2006.01) |
| *C01B 39/40* | (2006.01) |
| *C01B 39/36* | (2006.01) |

(52) U.S. Cl.
CPC ............... *C01B 39/48* (2013.01); *B01J 20/18* (2013.01); *B01J 20/186* (2013.01); *B01J 20/28004* (2013.01); *B01J 20/2805* (2013.01); *B01J 20/2808* (2013.01); *B01J 20/2809* (2013.01); *B01J 29/005* (2013.01); *B01J 29/405* (2013.01); *B01J 29/86* (2013.01); *B01J 29/87* (2013.01); *C01B 39/00* (2013.01); *C01B 39/36* (2013.01); *C01B 39/38* (2013.01); *C01B 39/40* (2013.01); *H04R 1/025* (2013.01); *H04R 1/288* (2013.01); *B01J 2229/183* (2013.01); *C01P 2002/30* (2013.01); *C01P 2002/60* (2013.01); *C01P 2004/61* (2013.01); *C01P 2004/62* (2013.01); *C01P 2004/64* (2013.01)

(58) Field of Classification Search
CPC ........ B01J 29/005; B01J 29/405; B01J 29/86; B01J 29/87; B01J 2229/183; B01J 20/18; B01J 20/186; B01J 20/28004; B01J 20/2805; B01J 20/2808; B01J 20/2809; C01B 39/00; C01B 39/36; C01B 39/38; C01B 39/40; C01B 39/48; H04R 1/288; H04R 1/025; C01P 2004/61; C01P 2004/62; C01P 2002/30; C01P 2002/60
USPC ........ 502/60, 61, 73, 77, 400, 407, 411, 414
See application file for complete search history.

(56) References Cited

U.S. PATENT DOCUMENTS

| | | | |
|---|---|---|---|
| 2013/0170687 A1* | 7/2013 | Papakyriacou | ........ B01J 20/183 381/338 |
| 2014/0064540 A1* | 3/2014 | Lin | ...................... H04R 1/2803 381/346 |
| 2015/0068402 A1* | 3/2015 | Lin | ........................... C08J 9/40 96/153 |
| 2015/0104364 A1* | 4/2015 | Elomari | ............. B01D 53/9418 423/212 |
| 2016/0127812 A2* | 5/2016 | Papakyriacou | ...... B01J 20/2808 381/338 |
| 2016/0318299 A1* | 11/2016 | Arai | ........................ C09D 11/10 |
| 2018/0167721 A1* | 6/2018 | Feng | ....................... C01B 39/46 |

FOREIGN PATENT DOCUMENTS

WO    WO 2014/036289    *    3/2014

* cited by examiner

*Primary Examiner* — Elizabeth D Wood
(74) *Attorney, Agent, or Firm* — IPro, PLLC; Na Xu

(57) ABSTRACT

The present disclosure relates to a molecular sieve, preparation thereof and acoustic absorption material and speaker containing the same. The molecular sieve having an MFI-structure, comprising a framework and an off-framework cation, wherein the framework comprises $SiO_2$ and a metal oxide $M_xO_y$, with M comprising boron, gallium or aluminium; the off-framework cation is at least one of hydrogen ion, alkali metal ion and alkaline earth metal ion. The molecular herein can effectively prevent the failure of the molecular sieve and improve the performance stability of the speaker.

19 Claims, 13 Drawing Sheets

MOLECULAR SIEVE, PREPARATION THEREOF AND ACOUSTIC ABSORPTION MATERIAL AND SPEAKER CONTAINING THE SAME

CROSS REFERENCE TO RELATED APPLICATIONS

This application claims the priority benefit of Chinese Patent Application No. 201810044489.0 filed on Jan. 17, 2018, 201810044834.0 filed on Jan. 17, 2018, and 201810006518.4 filed on Jan. 4, 2018, the entire content of which is incorporated herein by reference.

TECHNICAL FIELD

The present disclosure relates to a molecular sieve, preparation thereof and acoustic absorption material and speaker containing the same, in particular to a molecular sieve for improving low frequency performance and performance stability of a speaker, preparation thereof and acoustic absorption material and speaker containing the same.

BACKGROUND

With development of science and technology and improvement of living level, people have higher and higher requirements for performance of a speaker. In particular, a speaker of a mobile phone is required to provide excellent acoustic performance while a volume of the speaker is minimized. The sound quality of the speaker is closely related to their designing and manufacturing process, particularly to size design of a rear cavity of the speaker. Under a general circumstance, the smaller the rear cavity of the speaker is, the worse an acoustic response of a low frequency band is, and the worse acoustic expression such as sound quality is. Therefore, it is required to manage to expand the rear cavity of the speaker to improve its acoustic response of low frequency band. In the prior art, an acoustic absorption material such as porous carbon, silicon dioxide, and single-structure molecular sieve is usually filled into the rear cavity of a speaker to increase virtual volume of the rear cavity so that acoustic compliance of air in the rear cavity is improved, thereby improving low frequency performance. The single-structure molecular sieve has the best effect of improving the low frequency performance.

However, the inventor found at least the following problems exist in the prior art: surface micropores of a single-structure molecular sieve are easily blocked by moisture and organic matters in the air, thereby invalidating the molecular sieve and allowing the speaker to have low performance stability.

An ordinary molecular sieve easily adsorbs moisture in the air at the environment of room temperature and micropores are occupied. To maintain patency of the micropores in the environment of room temperature, the high silicon molecular sieves with extremely strong hydrophobicity are usually selected, in which the ratio of Si/Al is usually higher than 200. At this time, although a good low frequency improvement effect can be obtained, the amount of charged ions in the pore channel and framework is small, and the acting force of the molecular sieve and air molecules ($N_2$, $O_2$) is mainly van der Waal's force, and the electrostatic field action of the air molecules is very limited, therefore the amount of normal-temperature adsorbed air is limited, which limits the further improvement of the lower frequency improvement performance.

BRIEF DESCRIPTION OF DRAWINGS

The specific embodiments of the present disclosure are exemplified below with reference to the accompanying drawings, which are not intended to limit the invention. Elements in the drawings having the same reference numerals are denoted by similar elements, and the figure in the drawings are not to be construed as limiting.

DETAILED DESCRIPTION

Figure 1:
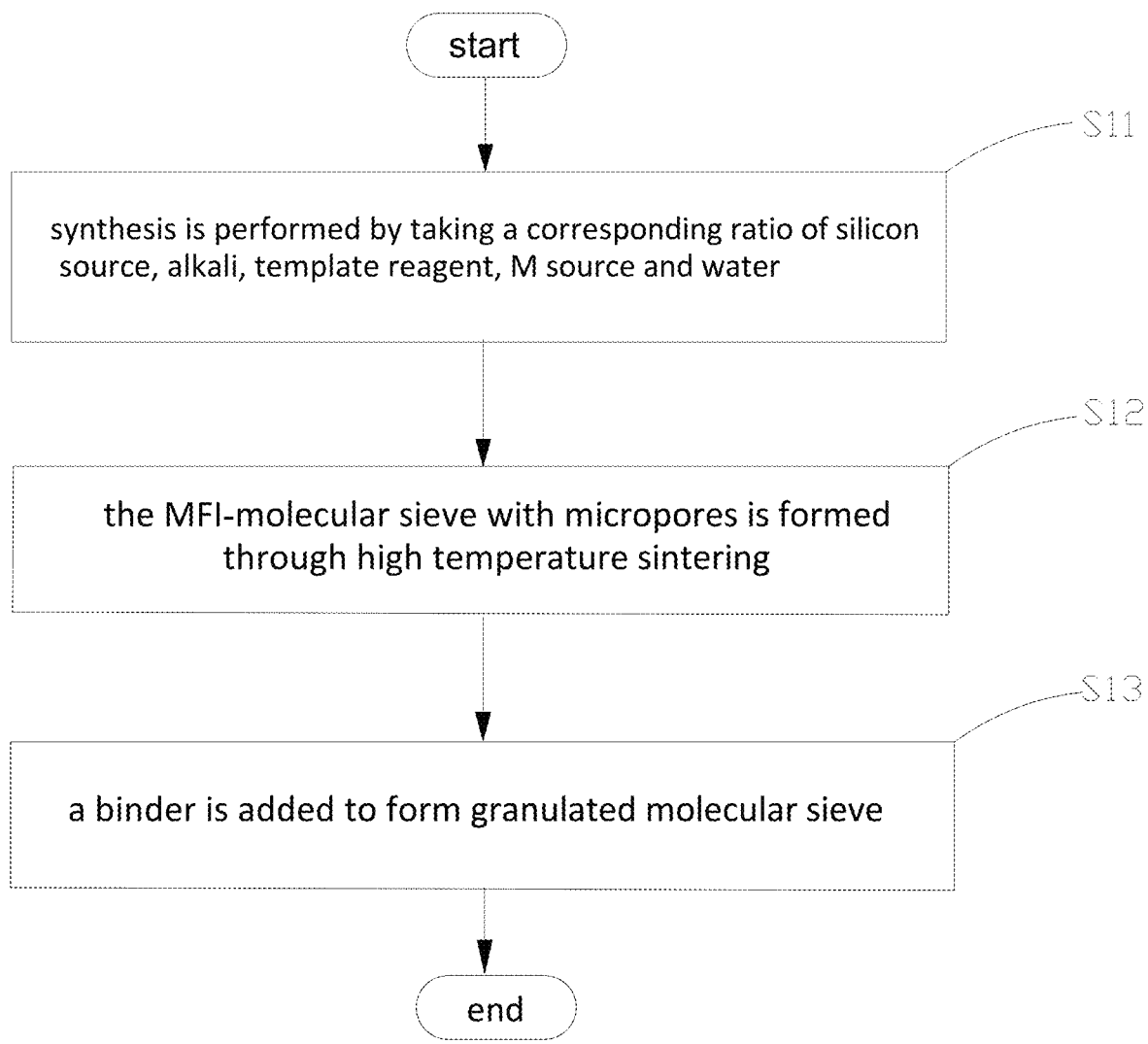
FIG. 1 is a flowchart illustrating a method for preparing an MFI-structure boron-doped molecular sieve according to an embodiment of the present disclosure.

To make the objective, technical solutions and advantages of the embodiments of the present disclosure clearer, each embodiment (example) of the present disclosure will be detailed below in combination with accompanying drawings. However, those skilled in the art may understand that many technical details are put forward in each embodiment to help the readers to better understand the present disclosure. But, the technical solutions claimed by the present disclosure may be achieved based on different changes and modifications of the following different embodiments without these technical details.

An embodiment of the present disclosure relates to a molecular sieve 10 having an MFI-structure, comprising a framework and an off-framework cation, the framework includes $SiO_2$ and a metal oxide $M_xO_y$, a molar ratio of Si/M in the framework is at least 50 with M including Boron (B), and the off-framework cation is at least one of hydrogen (H) ion, alkali metal ion and alkaline earth metal ion.

Compared with the prior art, the molecular sieve 10 in this embodiment of the present disclosure includes a framework and an off-framework cation, and therefore, a layer of macroporous structure having a different property and larger pore size is grown on a surface of the microporous structure that has adsorption and desorption effect for air. On one hand, due to large pore size of the macroporous structure, air entering or leaving the inner-layer microporous structure is seldom affected, which ensuring the effect of improving the low frequency performance by the inner-layer microporous structure; on the other hand, the macroporous structure on the surface layer may adsorb moisture and organic matters in the air so that the inner microporous structure having adsorption and desorption effect is not blocked by water molecules and organic matters, thereby effectively preventing failure of molecular sieve and improving performance stability of the speaker. It is worth mentioning that the inventor found that if a molar ratio of silicon and boron is less than 50, the macroporous structure on the surface layer of the molecular sieve 10 will have noticeably decreased capability to adsorb moisture, so that the microporous structure for adsorption and desorption may significantly adsorb moisture in the air. Thus, the moisture occupies most microporous channels of the molecular sieve 10, resulting in a lower effect of improving low frequency performance; in addition, excessively low molar ratio of silicon and boron may also result in that the MFI-structure is difficult to be synthesized or the synthesized MFI-structure has a bad crystallization degree. Thus, in this embodiment, the molar ratio of silicon and boron is equal to or greater than 50, so that the low frequency improvement effect is good, synthesis is not difficult to perform and the crystallization degree is good.

Preferably, the molar ratio of silicon and boron in the framework is greater than 100. The molar ratio of silicon and boron is higher, and the speaker with its rear cavity filled with the molecular sieve 10 has better acoustic performance of low frequency band.

In addition, M may also include trivalent metal ion and/or tetravalent metal ion in addition to boron (B). In this embodiment, the trivalent metal ion may also include one or more of iron ion and aluminum ion. The tetravalent metal ion may include one or more of titanium ion and zirconium ion. Those skilled in the art may understand that the types of trivalent metal ion and tetravalent metal ion are not limited to the above examples and may also be other metal ions, which will not affect the effect of the present disclosure.

In the embodiment, the particle size of the molecular sieve 10 is greater than 10 nanometers, preferably, the particle size of the molecular sieve 10 is greater than 10 nanometers and less than 10 micrometers. Due to small particle size of the molecular sieve 10, it also needs to be molded together with a binder into large particles during pratical application so that the sieve can be suitably used as an acoustic absorption material.

It is noted that in the embodiment, the molecular sieve 10 may be a purephase MFI-structure molecular sieve. Due to high purity of the purephase molecular sieve, the speaker with the rear cavity filled with the molecular sieve 10 has better acoustic performance in low frequency band.

An embodiment of the present disclosure also provides a method for preparing the molecular sieve 10 described above. The specific flowchart is shown in FIG. 1.

S11: synthesis is performed by taking a corresponding ratio of silicon source, alkali, template reagent, M source and water.

Specifically, in S11, the silicon source, boron source, alkali source, template reagent is dissolved and aged in the solvent (water). The silicon source includes at least one of ethyl silicate, silica sol and sodium silicate; the boron source includes at least one of sodium borate, boric acid, sodium metaborate, diborane and so on; the alkali source includes at least one of sodium hydroxide, potassium hydroxide, lithium hydroxide and organic base; the template reagent is at least one of organic amine or organic quaternary ammonium salt, tetrapropyl quaternary ammonium salt or quaternary ammonium hydroxide, tetrapropyl quaternary ammonium salt or quaternary ammonium hydroxide and a small amount of auxiliary agent.

S12: the MFI-molecular sieve with micropores is formed through high temperature sintering.

Specifically, in S12, a substance synthesized in step S11 is added to a synthesis reactor and sintered at high temperature and high pressure. In the embodiment, the temperature increase speed is 0.5-5° C./min, and preferably 1-3° C./min and the sintering temperature is 400-700° C. and preferably, 500-600° C. When the temperature increases to the maximum sintering temperature, the reactor is incubated for 1-2 hours and then cooled at room temperature to form the MFI-molecular sieve 10 with micropores. In the embodiment, the molecular sieve 10 prepared by S12 is in the form of powder with a particle size of 10 nanometers to 10 micrometers.

S13: a binder is added to form granulated molecular sieve.

Since the particle size of the molecular sieve 10 formed in S12 is too small, if the molecular sieve is directly filled into the rear cavity of the speaker as an acoustic absorption material, the sieve is easy to leak out of a filling zone, thereby affecting normal use of the speaker. Thus, in S13, a binder is added to the molecular sieve 10 to form a granulated molecular sieve so that the sieve can be filled suitably as an acoustic absorption material. The binder mainly includes inorganic binder and organic polymer binder: the inorganic binder may be selected from activated alumina, silica sol and so on; the organic polymer binder may be selected from acrylic ester, epoxy, polyurethane and so on.

It is noted that a solvent and an auxiliary agent may also be added during the process of binding the molecular sieve 10 into a granular shape. The solvent mainly refers to water and various common organic solvents, such as alcohol, methylbenzene, acetone and tetrahydrofuran and so on. Wherein the auxiliary agent may be a modifier or a pore expanding agent and so on, such as at least one of sesbania powder, graphite, activated carbon, paraffin, stearic acid, glycerin, oxalic acid, tartaric acid, citric acid, starch, polyethylene glycol, polyvinyl alcohol, polyethylene oxide, polyacrylamide, methyl cellulose, cellulose, polymeric alcohol, nitric acid, hydrochloric acid, acetic acid, formic acid, ammonium hydroxide, tetramethylammonium hydroxide, tetraethylammonium hydroxide, and tetrapropylammonium hydroxide, and the auxiliary agent is added in an amount less than 5% (weight ratio).

In the embodiment, after S12 and before S13, a step of performing cation exchange for the molecular sieve 10 may also be included, so that different types of MFI-structure molecular sieves 10 are obtained. In the step, ammonium salt, mono-valent copper salt, mono-valent silver salt, mono-valent gold salt, salt of alkali metal or salt of alkaline earth metal is used to exchange with zeolite. The ammonium salt may be ammonium chloride, ammonium nitrate, ammonium sulfate, ammonium carbonate and so on; the copper salt may be cuprous chloride, the silver salt may be silver nitrate; the alkali metal may be: lithium salt, sodium salt, potassium salt, rubidium salt and so on, and the anion of the alkali metal salt may be chloride, sulfate, nitrate and so on; the salt of alkaline earth metal may be magnesium salt, calcium salt, barium salt and so on, and the anion of the alkali metal salt may be chloride, sulfate, nitrate and so on.

Figure 2:
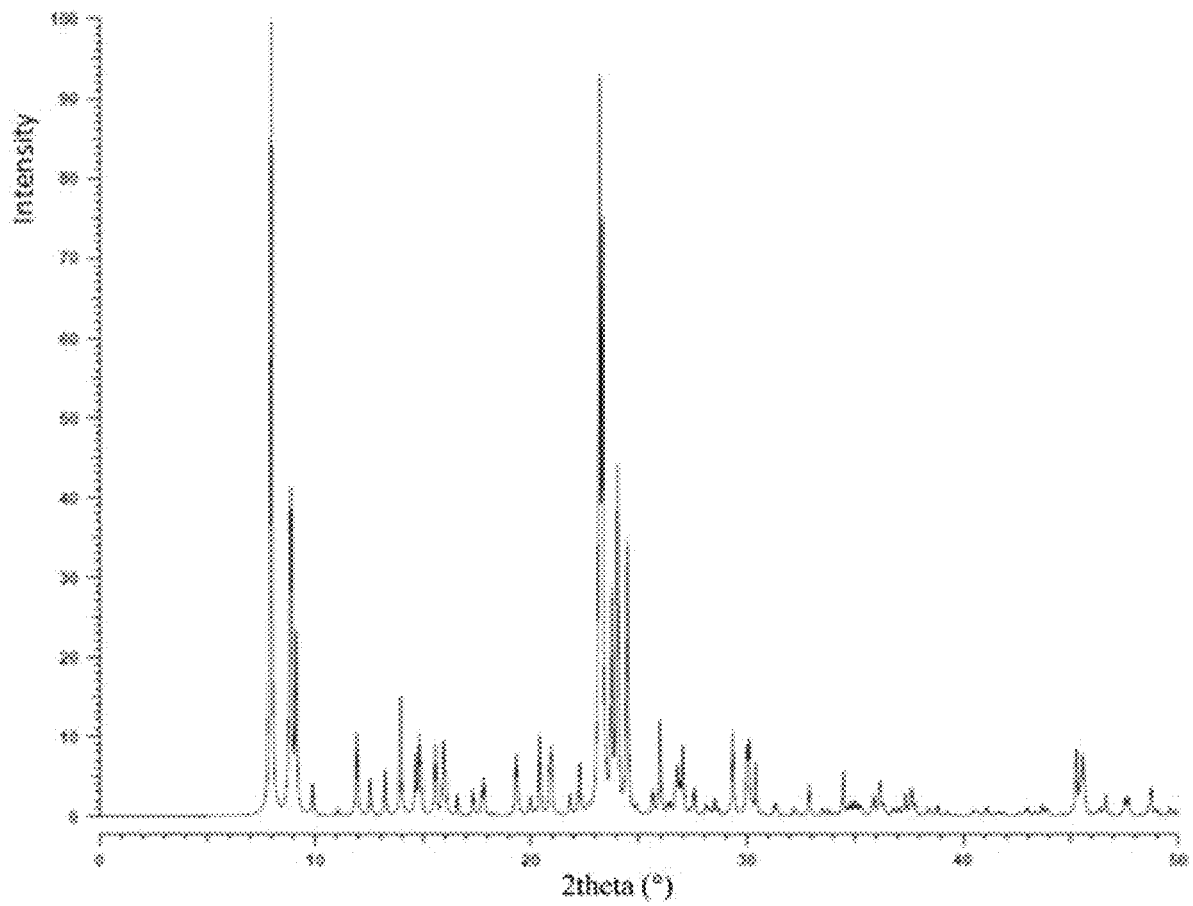
FIG. 2 is a standard XRD (X ray diffraction) spectrum of a ZSM-5-structure molecular sieve.
Figure 3:
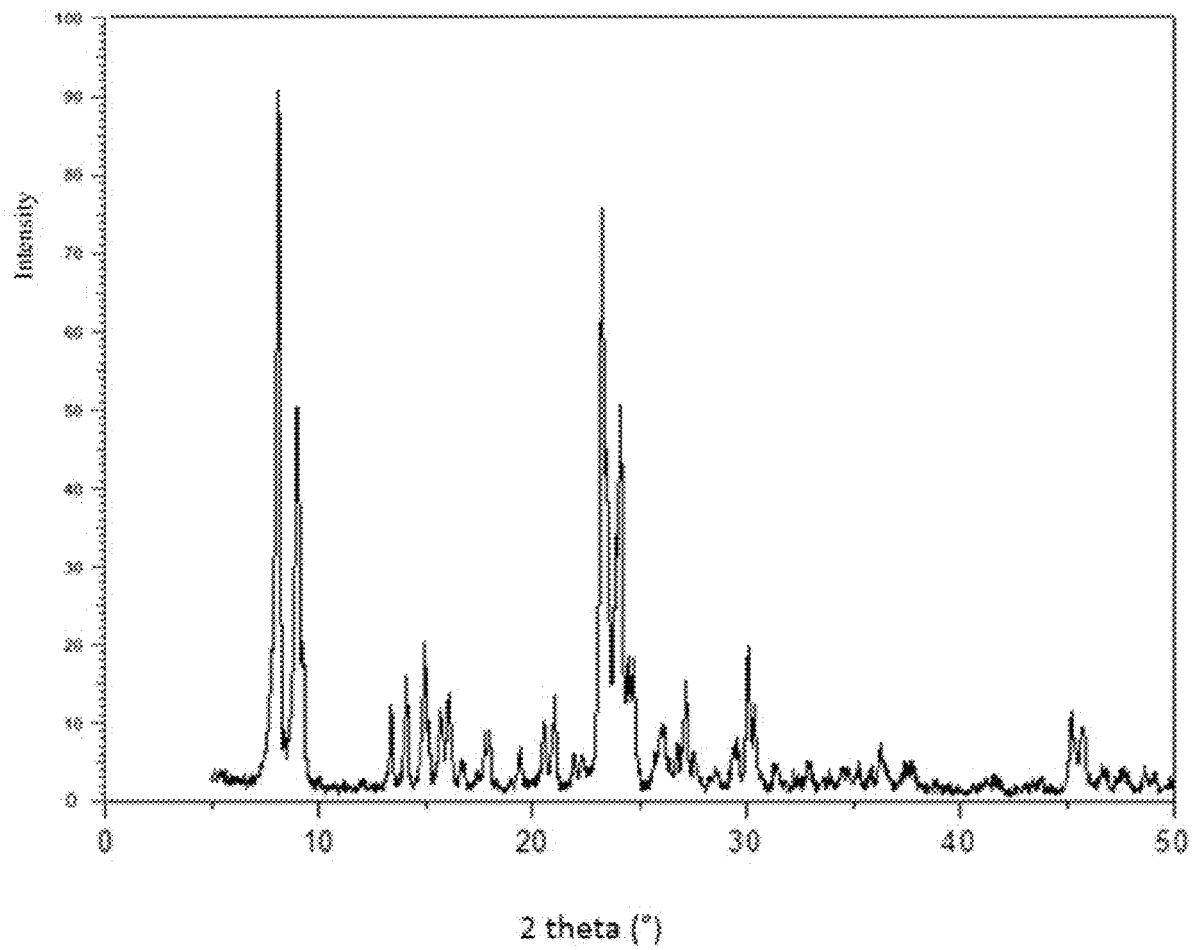
FIG. 3 is an XRD (X ray diffraction) spectrum of a boron-doped ZSM-5-structure molecular sieve prepared according to example 1 of the present disclosure.

Example 1 provides a method for preparing the MFI-structure molecular sieve 10, wherein the MFI-structure molecular sieve 10 with a molar ratio of silicon and boron being 50 is synthesized by using silicon source, boron source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. The molded particles are placed into a suitable speaker tooling to test its acoustic performance. The rear cavity of the speaker tooling required for testing the acoustic performance is one cubic centimeters in volume. The specific test data is shown in Table 1, X-ray diffraction (XRD) standard spectrum of ZSM-5-structure molecular sieve is shown in FIG. 2 and X-ray diffraction spectrum of boron-doped ZSM-5-structure molecular sieve is shown in FIG. 3.

Example 2 provides another method for preparing the MFI-structure molecular sieve 10, wherein the MFI-structure molecular sieve 10 with a molar ratio of silicon and boron being 300 is synthesized by using silicon source, boron source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. The molded particles are placed into a suitable speaker tooling to test its acoustic performance. The rear cavity of the speaker tooling required for testing the acoustic performance is one cubic centimeters in volume. The specific test data is shown in Table 1.

Example 3 provides another method for preparing the MFI-structure molecular sieve 10, wherein the MFI-structure molecular sieve 10 with a molar ratio of silicon and boron being 50 is synthesized by using silicon source, boron source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. A small amount of aluminum is added and the mass content of aluminum in the synthesized powder is 0.15%. The molded particles are placed into a suitable speaker tooling to test its acoustic performance. The rear cavity of the speaker tooling required for testing the acoustic performance is one cubic centimeters in volume. The specific test data is shown in Table 1.

Example 4 provides another method for preparing the MFI-structure molecular sieve 10, wherein the MFI-structure molecular sieve 10 with a molar ratio of silicon and boron being 50 is synthesized by using silicon source, boron source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. A sodium type MFI structure molecular sieve is obtained through exchange with sodium ion. The sodium salt includes at least one of sodium chloride, sodium sulfate, sodium nitrate and so on, but not limited to herein. The molded particles are placed into a suitable speaker tooling to test its acoustic performance. The rear cavity of the speaker tooling required for testing the acoustic performance is one cubic centimeters in volume. The specific test data is shown in Table 1.

Example 5 provides another method for preparing the MFI-structure molecular sieve 10, wherein the MFI-structure molecular sieve 10 with a molar ratio of silicon and boron being 50 is synthesized by using silicon source, boron source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. A sodium-potassium type MFI-structure is obtained through exchange with sodium ion and potassium ion. Where the sodium salt includes at least one of sodium chloride, sodium sulfate, sodium nitrate and so on, but not limited to herein. Where the potassium salt includes at least one of potassium chloride, potassium sulfate, potassium nitrate and so on, but not limited to herein. The molded particles are placed into a suitable speaker tooling to test its acoustic performance. The rear cavity of the speaker tooling required for testing the acoustic performance is one cubic centimeters in volume (referred to as 1 cc). The specific test data is shown in Table 1.

TABLE 1

| | List of the acoustic performances | | | | | |
| --- | --- | --- | --- | --- | --- | --- |
| | 1 cc | | | | | |
| | Cavity | | 1 cc Dbass | | Decrease values | |
| Samples | $F_0$ (Hz) | Q | $F_0$ (Hz) | Q | $\Delta F_0$ (Hz) | $\Delta Q$ |
| Example 1 | 912 | 1.5 | 660 | 0.8 | 252 | 0.7 |
| Example 2 | 910 | 1.5 | 645 | 0.7 | 265 | 0.8 |
| Example 3 | 910 | 1.6 | 648 | 0.8 | 262 | 0.8 |
| Example 4 | 911 | 1.5 | 650 | 0.7 | 261 | 0.8 |
| Example 5 | 910 | 1.5 | 648 | 0.7 | 262 | 0.8 |

In Table 1, $F_0$ is an inherent frequency and Q is a sound-absorbing coefficient.

The test data shows that when the molar ratio of silicon and boron of an MFI-molecular sieve (example 2) is higher, the effect of improving the acoustic performance of low frequency band of the speaker is better. Doping an oxide of aluminum in the framework of the MFI-molecular sieve (example 3), performing sodium ion exchange for the MFI-molecular sieve (example 4) and performing sodium ion and potassium ion exchange for the MFI-molecular sieve (example 5) all can improve the acoustic performance of low frequency band. Through comparison of performing sodium ion exchange for the MFI-molecular sieve (example 4) and performing sodium ion and potassium ion exchange for the MFI-molecular sieve (example 5), it is shown that the effects of improving acoustic performances of low frequency band by the MFI-molecular sieves formed by both are basically same.

In one non-limiting embodiment of the present disclosure provides a molecular sieve having an MFI-structure, comprising a framework and an off-framework cation, and the framework includes $SiO_2$ and a metal oxide $M_xO_y$; an atomic ratio of Si/M in the framework is at least 100 with M including Gallium (Ga), and the off-framework cation is at least one of hydrogen (H) ion, alkali metal ion and alkaline earth metal ion.

It is worth mentioned that the inventor found if a molar ratio of silicon and gallium is less than 100, a microporous structure that serves for adsorption and desorption in the MFI-structure molecular sieve may noticeably adsorb moisture in the air and the moisture occupies most microporous channels of the MFI-structure molecular sieve, thereby lowering improvement effect of low frequency. In addition, excessively low molar ratio of silicon and gallium may also result in the MFI-structure molecular sieve is difficult to be synthesized or the synthesized MFI-structure molecular sieve has a bad crystallization degree. Thus, in one non-limiting embodiment of the present disclosure, the molar ratio of silicon and gallium is equal to or greater than 100, so that the low frequency improvement effect is good and synthesis is not difficult and crystallization degree is good. Specifically, the molar ratio of silicon and gallium in the MFI-structured molecular sieve is preferably above 200. The molar ratio of the silicon and gallium is higher and the speaker with its rear cavity filled with the MFI-structure molecular sieve has better acoustic performance of low frequency band.

In addition, M may also include trivalent and/or tetravalent metal ion in addition to gallium. In this embodiment, the trivalent and/or tetravalent metal ion may also include one or more of aluminum ion, chromium ion, iron ion, nickel ion, titanium ion, zirconium ion and germanium ion. Those skilled in the art may understand that the types of the trivalent and tetravalent metal ions are not limited to the above examples and may also be another metal ion, which will not be affect the effect of the present disclosure.

It is noted that in this embodiment, the particle size of the MFI-structure molecular sieve is greater than 10 nanometers, and preferably the particle size of the MFI-structure molecular sieve is greater than 10 nanometers but less than 10 micrometers. Due to small particle size of the MFI-structure molecular sieve, it also needs to be molded together with a binder into large particles during practical application so that the molecular sieve can be used as an acoustic absorption material.

It is noted that in this embodiment, the molecular sieve may be a pure phase MFI-structure molecular sieve. Due to high purity of the pure phase molecular sieve, a speaker with a rear cavity filled with the MFI-structure molecular sieve has better acoustic performance in a low frequency band. The molecular sieve may also be an MFI-structure molecular sieve containing another mixed phase such as MEL, BEA, which will not affect the effect of the present disclosure.

In one non-limiting embodiment of the present disclosure provides a molecular sieve having an MFI-structure, comprising a framework and an off-framework cation, and the framework includes $SiO_2$ and a metal oxide $M_xO_y$; an atomic ratio of Si/M in the framework is 50 to 200 with M including aluminum, and the off-framework cation is at least one of hydrogen ion, alkali metal ion and alkaline earth metal ion.

It is worth mentioned that the inventor found if the molar ratio of Si/Al of the molecular sieve is 50 to 200, and preferably is 80 to 200. the low frequency improvement performance of the obtained molecular sieve better, its stability is also improved to some extent.

Further, M may also include trivalent and/or tetravalent metal ion in addition to aluminum. In this embodiment, the trivalent and/or tetravalent metal ion may also include one or more of chromium ion, iron ion, nickel ion, titanium ion, zirconium ion and germanium ion. Those skilled in the art may understand that the types of the trivalent and tetravalent metal ions are not limited to the above examples and may also be another metal ion, which will not affect the effect of the present disclosure.

It is noted that in this embodiment, the particle size of the MFI-structure molecular sieve is greater than 10 nanometers, and preferably the particle size of the MFI-structure molecular sieve is greater than 10 nanometers but less than 10 micrometers. Due to the small particle size of the MFI-structure molecular sieve, it also needs to be molded together with a binder into large particles during practical application so that the sieve can be suitably used as an acoustic absorption material.

It is noted that in this embodiment, the molecular sieve may be a pure-phase MFI-structure molecular sieve. Due to high purity of the pure-phase molecular sieve, a speaker with a rear cavity filled with the MFI-structure molecular sieve has better acoustic performance in a low frequency band. The molecular sieve may also be an MFI-structure molecular sieve containing another mixed phase such as MEL and BEA, which will not affect the effect of the present disclosure.

In another embodiment of the present disclosure provides an acoustic absorption material. The acoustic absorption material includes an MFI-structure molecular sieve. The MFI-structure molecular sieve includes a framework and an off-framework cation, and the framework includes $SiO_2$ and a metal oxide $M_xO_y$; an atomic ratio of Si/M in the framework is at least 100 with M including Gallium (Ga), and the off-framework cation is at least one of hydrogen (H) ion, alkali metal ion and alkali earth metal ion.

Compared with the prior art, because the MFI-structure molecular sieve in the embodiment of the present disclosure includes silicon dioxide having uniform micropores, the micropores can adsorb and desorb air molecules under the action of acoustic pressure and plays a role of increasing a virtual acoustic cavity volume. When the sieve is filled into the rear cavity of the speaker, the low frequency effect of the speaker can be noticeably improved and its low frequency acoustic performance can be enhanced. Since the MFI-structure molecular sieve can be placed into a small cavity due to its small volume, a problem that an acoustic absorption material is difficult to be packaged by the acoustic cavity of the speaker due to small size of the acoustic cavity can be solved, thereby meeting the requirement of the speaker developing toward a decreasing volume. In addition, the MFI-structure molecular sieve also includes an off-framework cation which can effectively improve stability of the molecular sieve, thereby increasing performance stability of the speaker. It is worth mentioning that the inventor found that if a molar ratio of silicon and gallium is less than 100, a microporous structure that serves for adsorption and desorption in the MFI-structure may noticeably adsorb moisture in the air and the moisture occupies most microporous channels of the MFI-structure molecular sieve, thereby lowering improvement effect of low frequency. In addition, excessively low molar ratio of silicon and gallium may also result in that the MFI-structure is difficult to be synthesized or the synthesized MFI-structure has a bad crystallization degree. Thus, in the embodiment, the molar ratio of silicon and gallium is equal to or greater than 100, so that the low frequency improvement effect is good and synthesis is not difficult and crystallization degree is good.

Specifically, the molar ratio of silicon and gallium in the MFI-structure molecular sieve is preferably above 200. The molar ratio of the silicon and gallium is higher and the speaker with its rear cavity filled with the MFI-structure molecular sieve has better acoustic performance of low frequency band.

In addition, M may also include trivalent and/or tetravalent metal ion in addition to gallium. In the embodiment, the trivalent and/or tetravalent metal ion may also include one or more of aluminum ion, chromium ion, iron ion, nickel ion, titanium ion, zirconium ion and germanium ion. Those skilled in the art may understand that the types of the trivalent and tetravalent metal ions are not limited to the above examples and may also be another metal ion, which will not be affect the effect of the present disclosure.

It is noted that in the embodiment, the particle size of the MFI-structure molecular sieve is greater than 10 nanometers, and preferably the particle size of the MFI-structure molecular sieve is greater than 10 nanometers but less than 10 micrometers. Due to small particle size of the MFI-structure molecular sieve, it also needs to be molded together with a binder into large particles during practical application so that the sieve can be used as an acoustic absorption material.

It is noted that in the embodiment, the molecular sieve may be a pure phase MFI-structure molecular sieve. Due to high purity of the pure-phase molecular sieve, a speaker with a rear cavity filled with an MFI-structure molecular sieve has better acoustic performance in a low frequency band. The molecular sieve may also be an MFI-structure molecular sieve containing another mixed phase such as MEL, BEA, which will not affect the effect of the present disclosure.

Figure 4:
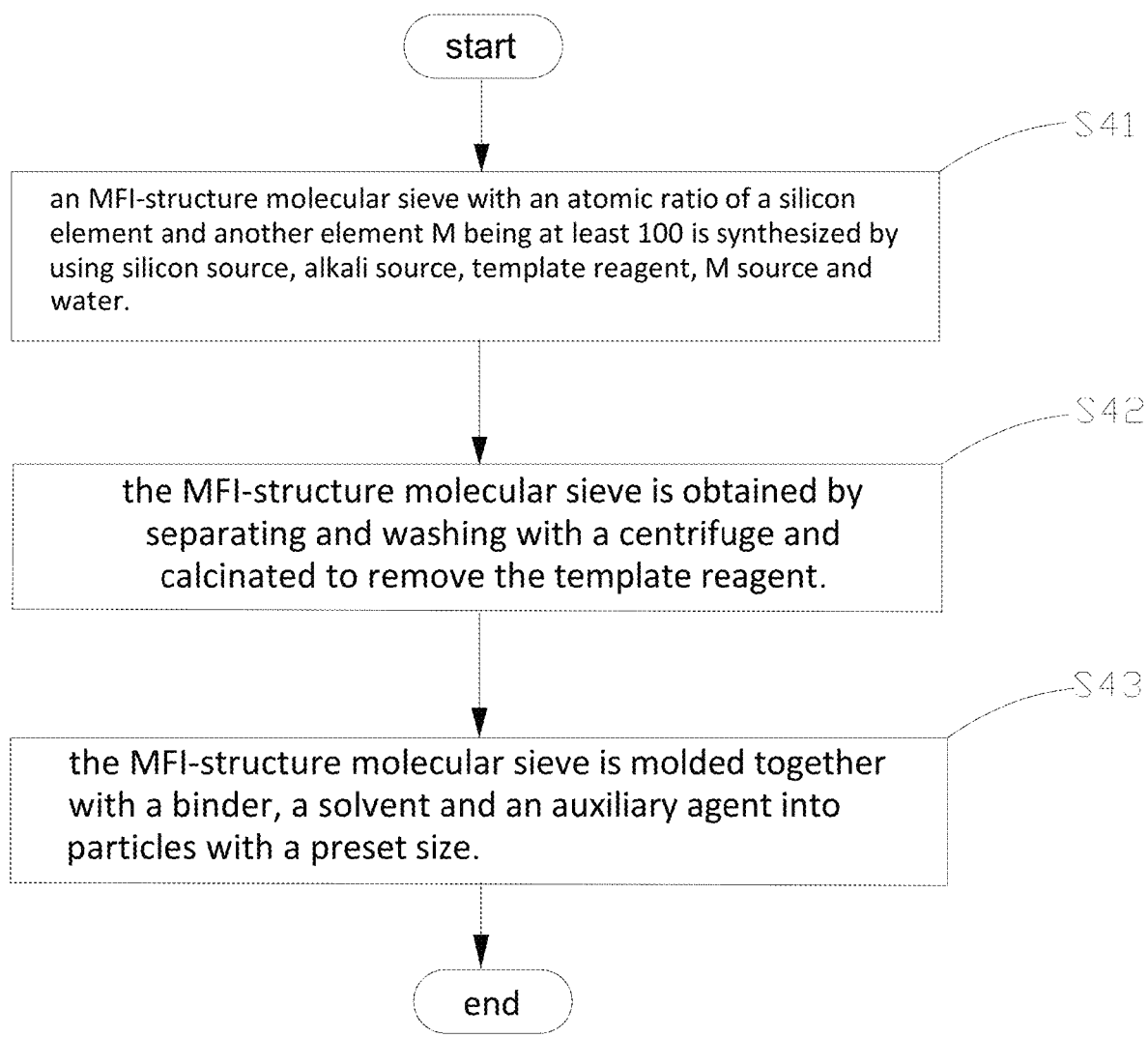
FIG. 4 is a flowchart illustrating a method for preparing an acoustic absorption material according to another embodiment of the present disclosure.

The present disclosure also provides a method for preparing the above acoustic absorption material and the specific flowchart is shown in FIG. 4.

S41: an MFI-structure molecular sieve with an atomic ratio of a silicon element and another element M being at least 100 is synthesized by using silicon source, alkali source, template reagent, M source and water.

Specifically, in S41, the M source is a gallium source, the synthetic raw materials (a silicon source, a gallium source, a template reagent and an alkali source and so on) are added to a synthesis reactor and then an MFI-structure molecular sieve powder is obtained through crystallization reaction. The crystallization reaction is usually performed for a particular period in an aqueous phase, and also is called hydrothermal reaction; the hydrothermal reaction temperature is generally the room temperature to 250° C., and preferably the room temperature to 180° C.; the pressure of the hydrothermal reaction is generally a pressure generated by a solvent such as water itself along with a change of temperature.

It is noted that in the embodiment, the silicon source includes at least one of ethyl silicate, silica sol, and sodium silicate; the gallium source includes at least one of gallium oxide, gallium nitrate and gallium sulfate; the alkali source includes at least one of sodium hydroxide, potassium hydroxide, lithium hydroxide and organic base; the template reagent is at least one of organic amine or organic quaternary ammonium salt, tetrapropyl quaternary ammonium salt or quaternary ammonium hydroxide, tetrapropyl quaternary ammonium salt or quaternary ammonium hydroxide and sodium dodecyl sulfate and so on.

S42: the MFI-structure molecular sieve is obtained by separating and washing with a centrifuge and calcinated to remove the template reagent.

Specifically, in S42, the preset time is the hydrothermal reaction time, the hydrothermal reaction time is generally half an hour to several months based on the conditions, and preferably 4 hours to 240 hours, the particle size of the MFI-structure molecular sieve subjected to hydrothermal reaction is controlled at 5 nm-20 μm, preferably, 10 nm-10 μm; the calcination temperature is 350-850° C., and preferably 500-700° C.

S43: the MFI-structure molecular sieve is molded together with a binder, a solvent and an auxiliary agent into particles with a preset size.

Specifically, in S43, because the particle size of the MFI-structure molecular sieve formed in S42 is too small, if the molecular sieve is directly filled into the rear cavity of the speaker as an acoustic absorption material, the molecular sieve is easy to leak out of a filling zone, thereby affecting normal use of the speaker. Thus, a binder is added to the MFI-structure molecular sieve to form a granulated molecular sieve in the S43 so that the molecular sieve can be suitably used as the acoustic absorption material. The particle size is 10 micrometers to 1000 micrometers and the binder mainly includes inorganic binder and organic polymer binder: the inorganic binder may be selected from activated alumina and silica sol and so on; the organic polymer binder may be selected from acrylic ester, epoxy, and polyurethane and so on. Where the solvent mainly refers to water and various common organic solvents such as ethyl alcohol, methylbenzene, acetone and tetrahydrofuran and so on. The auxiliary agent refers to another substance that is added in a very small amount and usually less than 5%.

It is noted that, after the S42 and before the S43, a step of performing cation exchange for the MFI-structure molecular sieve may also be included so that different types of MFI-structure molecular sieves may be obtained. In the step, ammonium salt, mono-valent copper salt, mono-valent silver salt, mono-valent gold salt, salt of alkali metal or salt of alkali earth metal is used to exchange with zeolite. The ammonium salt may be ammonium chloride, ammonium nitrate, ammonium sulfate, ammonium carbonate and so on; the copper salt may be cuprous chloride, the silver salt may be silver nitrate; the alkali metal may be lithium salt, sodium salt, potassium salt, rubidium salt and so on, and the anion of the alkali metal salt may be chloride, sulfate, nitrate and so on; the salt of alkaline earth metal may be magnesium salt, calcium salt, barium salt and so on, and the anion of the alkali metal salt may be chloride, sulfate, nitrate and so on.

Figure 5:
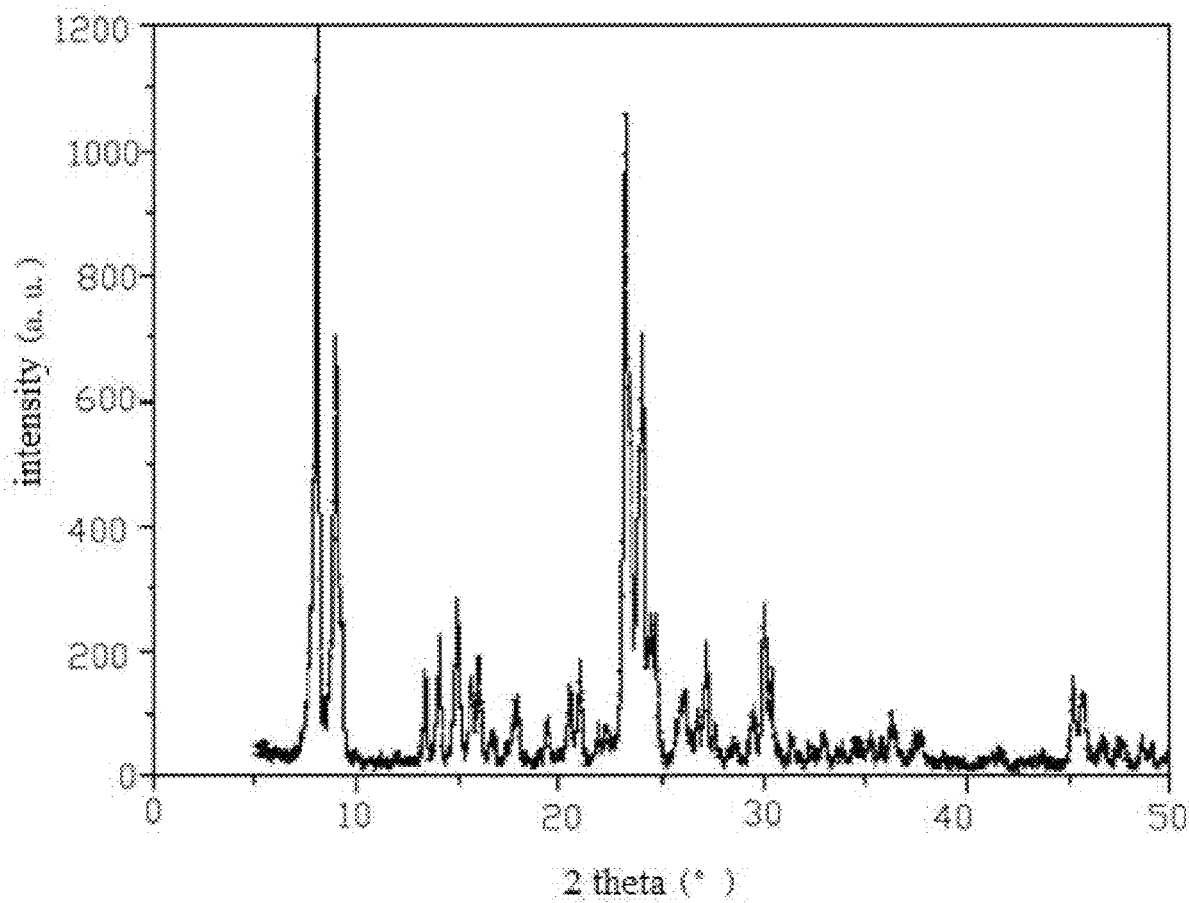
FIG. 5 is an XRD spectrum of an MFI-structure molecular sieve prepared according to example 1A of the present disclosure.
Figure 6:
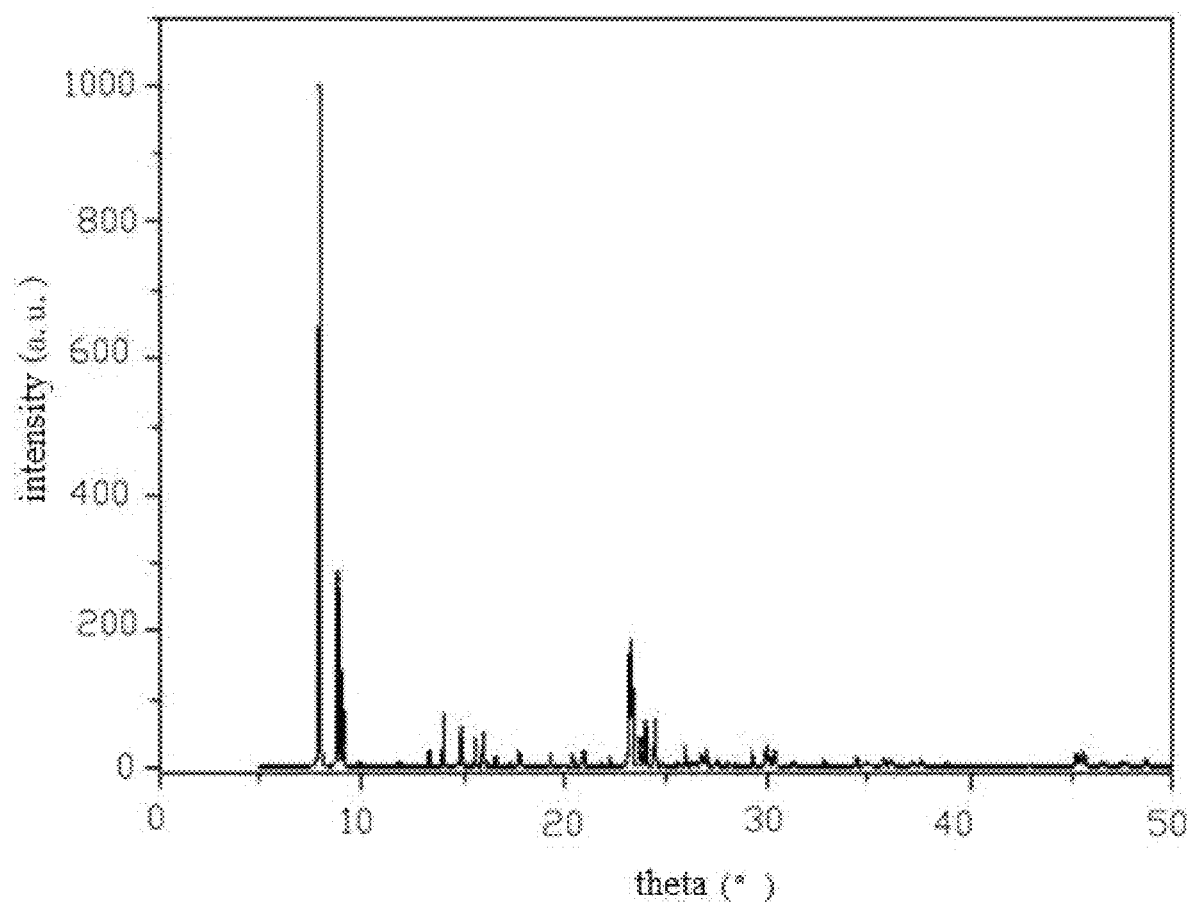
FIG. 6 is an XRD standard spectrum of ZSM-5-structure molecular sieve corresponding to the MFI-structure molecular sieve of FIG. 5.

Example 1A provides a method for preparing the acoustic absorption material, an MFI-structure molecular sieve with a molar ratio of silicon and gallium being 100 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. An XRD spectrum of the obtained MFI-structure molecular sieve is shown in FIG. 5 and an XRD standard spectrum of ZSM-5 is shown in FIG. 6. Through comparison, it can be known that characteristic peak positions in FIG. 5 and FIG. 6 are same.

Example 2A provides another method for preparing the acoustic absorption material, an MFI-structure molecular sieve with a molar ratio of silicon and gallium being 100 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. A sodium type MFI-structure is obtained through exchange with the sodium salt. The sodium salt includes at least one of sodium chloride, sodium sulfate, sodium nitrate and so on, which is not limited herein.

Example 3A provides another method for preparing the acoustic absorption material, an MFI-structure molecular sieve with a molar ratio of silicon and gallium being 100 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. A cuprous type MFI-structure molecular sieve is obtained through exchange with cuprous salt. The cuprous salt is cuprous chloride, which is not limited herein.

Example 4A provides another method for preparing the acoustic absorption material, an MFI-structure molecular sieve with a molar ratio of silicon and gallium being 200 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropylammonium fluoride.

Example 5A provides another method for preparing the acoustic absorption material, an MFI-structure molecular sieve with a molar ratio of silicon and gallium being 300 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. The molded particles are placed into suitable tooling to test its acoustic performance.

Example 6A provides another method for preparing the acoustic absorption material, an MFI-structure molecular sieve with a molar ratio of silicon and gallium being 200 is synthesized by using silicon source, gallium source, alkali source, template reagent and water. The template reagent is at least one of tetrapropyl ammonium bromide, tetrapropyl ammonium hydroxide, tetrapropyl ammonium chloride, tetrapropyl ammonium iodide and tetrapropyl ammonium fluoride. Wherein a small amount of aluminum is added and the mass content of aluminum in the synthesized powder is 0.15%.

The molecular sieves synthesized in examples 1A-6A are mixed respectively with a solvent, a binder and an auxiliary agent to prepare a suspended mixture which is dried and pulverized to obtain granulated acoustic absorption material. Then, the material are filled into the rear cavity (tooling rear cavity is one cubic centimeter in volume, which is referred to 1 cc) of the speaker respectively to perform acoustic performance test with results shown in Table 2 below.

TABLE 2

Resonant frequency $F_0$ and Q values before and after acoustic absorption material are added into the rear cavity of the speaker

| | 1 cc | | | | |
|---|---|---|---|---|---|
| | No acoustic absorption material is added into the rear cavity of the speaker | | 1 cc of acoustic absorption material are added | | Decrease value |
| Sample | $F_0$ (Hz) | Q value | $F_0$ (Hz) | Q value | $\Delta F_0$ (Hz) | $\Delta Q$ value |
| Example 1A | 908 | 1.4 | 650 | 0.6 | 258 | 0.8 |
| Example 2A | 909 | 1.4 | 648 | 0.5 | 261 | 0.9 |
| Example 3A | 908 | 1.5 | 655 | 0.7 | 253 | 0.8 |
| Example 4A | 910 | 1.4 | 655 | 0.7 | 255 | 0.7 |
| Example 5A | 909 | 1.5 | 653 | 0.6 | 256 | 0.9 |
| Example 6A | 909 | 1.4 | 652 | 0.7 | 257 | 0.7 |

It can be seen from Table 2 that the resonant frequency $F_0$ and Q values of the speaker are greatly decreased after the acoustic absorption material of examples 1A-6A are filled into the rear cavity of the speaker.

In another non-limiting embodiment of the present disclosure provides an acoustic absorption material. The acoustic absorption material includes an MFI-structure molecular sieve. The MFI-structure molecular sieve includes a framework and an off-framework cation, and the framework includes $SiO_2$ and a metal oxide $M_xO_y$, where an atomic ratio of Si/M in the framework is 50 to 200 with M including aluminum, and the off-framework cation is at least one of hydrogen ion, alkali metal ion and alkaline earth metal ion.

Compared to the prior art, since the MFI-structure molecular sieve in the embodiment of the present disclosure includes silicon dioxide having uniform micropores, the micropores can adsorb and desorb air molecules under the action of acoustic pressure and play a role of increasing a virtual acoustic cavity volume. When the molecular sieve is filled into the rear cavity of the speaker, the low frequency effect of the speaker can be noticeably improved and its low frequency acoustic performance can be enhanced. Since the MFI-structure molecular sieve can be placed into a small cavity due to its small volume, a problem that an acoustic absorption material is difficult to be packaged by the acoustic cavity of the speaker due to a small size of the acoustic cavity can be solved, thereby meeting the requirements of the speaker developing toward a decreasing volume. In the present disclosure, an MFI-structure molecular sieve that is difficult to adsorb moisture and has a significantly increased amount of air in adsorption and desorption at normal-temperature is obtained by balancing a contradiction between the moisture adsorption and the electrostatic field action and selecting an appropriate synthesis and post-treatment manner. In this way, the molecular sieve has better effect of improving low frequency performance. The mass ratio of Si/Al of the molecular sieve is 50 to 200, and preferably is 80 to 200. Further, the stability of the MFI-structure molecular sieve is also increased to some extent since more off-framework cations are included.

Preferably, the mass ratio of Si/Al of the MFI-structure molecular sieve is 80 to 200.

Further, M may also include trivalent and/or tetravalent metal ion in addition to aluminum. In the embodiment, the trivalent and/or tetravalent metal ion may also include one or more of chromium ion, iron ion, nickel ion, titanium ion, zirconium ion and germanium ion. Those skilled in the art may understand that the types of the trivalent and tetravalent metal ions are not limited to the above examples and may also be another metal ion, which will not affect the effect of the present disclosure.

It is noted that in the embodiment, the particle size of the MFI-structure molecular sieve is greater than 10 nanometers, and preferably the particle size of the MFI-structure molecular sieve is greater than 10 nanometers but less than 10 micrometers. Due to the small particle size of the MFI-structure molecular sieve, it also needs to be molded together with a binder into large particles during practical application so that the molecular sieve can be suitably used as a sound-absorbing material.

It is noted that in the embodiment, the molecular sieve may be a pure-phase MFI-structure molecular sieve. Due to high purity of the pure-phase molecular sieve, a speaker with a rear cavity filled with an MFI-structure molecular sieve has better acoustic performance in a low frequency band. The molecular sieve may also be an MFI-structure molecular sieve containing another impure phase such as MEL and BEA, which will not affect the effect of the present disclosure.

Figure 7:
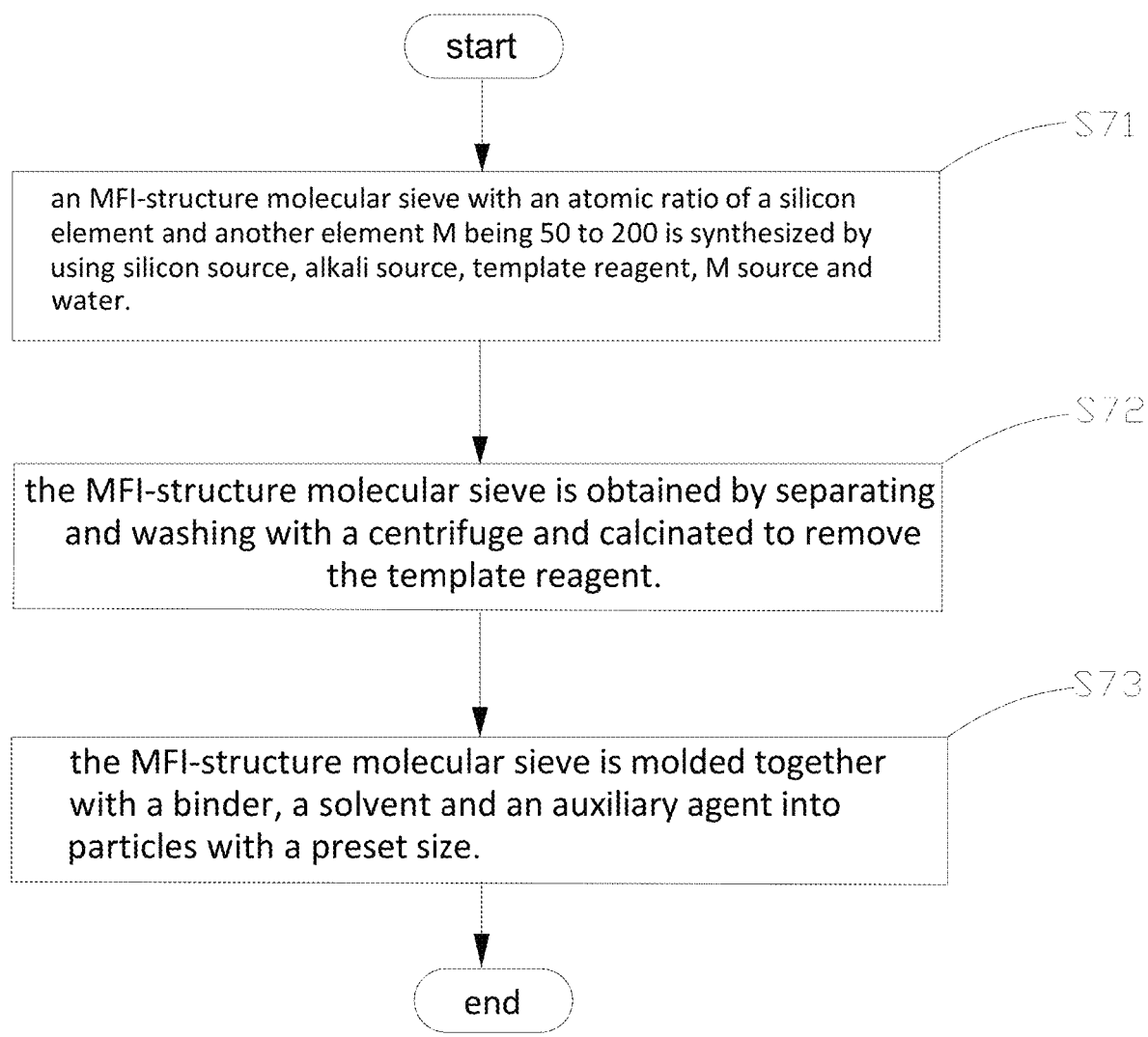
FIG. 7 is a flowchart illustrating a method for preparing an acoustic absorption material according to another embodiment of the present disclosure.

The embodiment of the present disclosure also provides a method for preparing the above mentioned acoustic absorption material, and a specific flowchart is shown in FIG. 7.

S71: an MFI-structure molecular sieve with an atomic ratio of a silicon element and another element M being 50 to 200 is synthesized by using silicon source, alkali source, template reagent, M source and water.

Specifically, in S71, the M source is an aluminum source, the synthetic raw materials (a silicon source, an aluminum source, a template reagent and an alkali source and so on) are added to a synthesis reactor, and then MFI-structure molecular sieve powder is obtained through crystallization reaction. The crystallization reaction is usually performed for a particular period in an aqueous phase, and is also called hydrothermal reaction; the hydrothermal reaction temperature is generally the room temperature to 250° C., and preferably the room temperature to 180° C.; the pressure of the hydrothermal reaction is generally a pressure generated by a solvent such as water itself along with a change of temperature.

It is noted that in the embodiment, the silicon source includes at least one of ethyl silicate, silica sol, and sodium silicate; the aluminum source includes at least one of aluminum oxynitrate, aluminum chloride, sodium metaaluminate and aluminum isopropoxide; the alkali source includes at least one of sodium hydroxide, potassium hydroxide, lithium hydroxide and organic base; the template reagent is at least one of organic amine or organic quaternary ammonium salt, tetrapropyl quaternary ammonium salt or quaternary ammonium hydroxide, tetrapropyl quaternary ammonium salt or quaternary ammonium hydroxide, and a small amount of auxiliary agent.

S72: the MFI-structure molecular sieve is obtained by separating and washing with a centrifuge and calcinated to remove the template reagent.

Specifically, in S72, the preset time is the hydrothermal reaction time, the hydrothermal reaction time is generally half an hour to several months based on conditions, and preferably 4 hours to 240 hours, the particle size of the MFI-structure molecular sieve subjected to hydrothermal reaction is controlled at 5 nm to 20 μm, and preferably 10 nm to 10 μm; the calcination temperature is 350 to 850° C., and preferably 500 to 700° C.

S73: the MFI-structure molecular sieve is molded together with a binder, a solvent and an auxiliary agent into particles with a preset size.

Specifically, in S73, because the particle size of the MFI-structure molecular sieve formed in S72 is too small, if the molecular sieve is directly filled into the rear cavity of the speaker as an acoustic absorption material, the molecular sieve is easy to leak out of a filling zone, thereby affecting normal use of the speaker. Thus, a binder is added to the MFI-structure molecular sieve to form a particles with a preset size in S73 so that it can be suitably used as the acoustic absorption material. Preferably, the particle size is 10 micrometers to 1000 micrometers, and the binder mainly includes an inorganic binder and an organic polymer binder: the inorganic binder may be selected from activated alumina and silica sol and so on; the organic polymer binder may be selected from acrylic ester, epoxy, and polyurethane and so on. The solvent mainly refers to water and various common organic solvents such as ethyl alcohol, methylbenzene, acetone and tetrahydrofuran and so on. The auxiliary agent refers to another substance that is added in a very small amount and usually less than 5%.

It is noted that, after S72 and before S73, a step of performing cation exchange for the MFI-structure molecular sieve may also be included so that different types of MFI-structure molecular sieves may be obtained. In this step, ammonium salt, mono-valent copper salt, mono-valent silver salt, mono-valent gold salt, salt of alkali metal or salt of alkaline earth metal may be used to perform ion exchange with the molecular sieve. The ammonium salt may be ammonium chloride, ammonium nitrate, ammonium sulfate, ammonium carbonate and so on; the copper salt may be cuprous chloride, the silver salt may be silver nitrate; the salt of alkali metal may be lithium salt, sodium salt, potassium salt, rubidium salt and so on, and the anion of the alkali metal salt may be chloride, sulfate, nitrate and so on; the salt of alkaline earth metal may be magnesium salt, calcium salt, barium salt and so on, and the anion of the alkaline metal salt may be chloride, sulfate, nitrate and so on.

Examples of the embodiment of the present disclosure will be described below in combination with specific examples.

Figure 8:
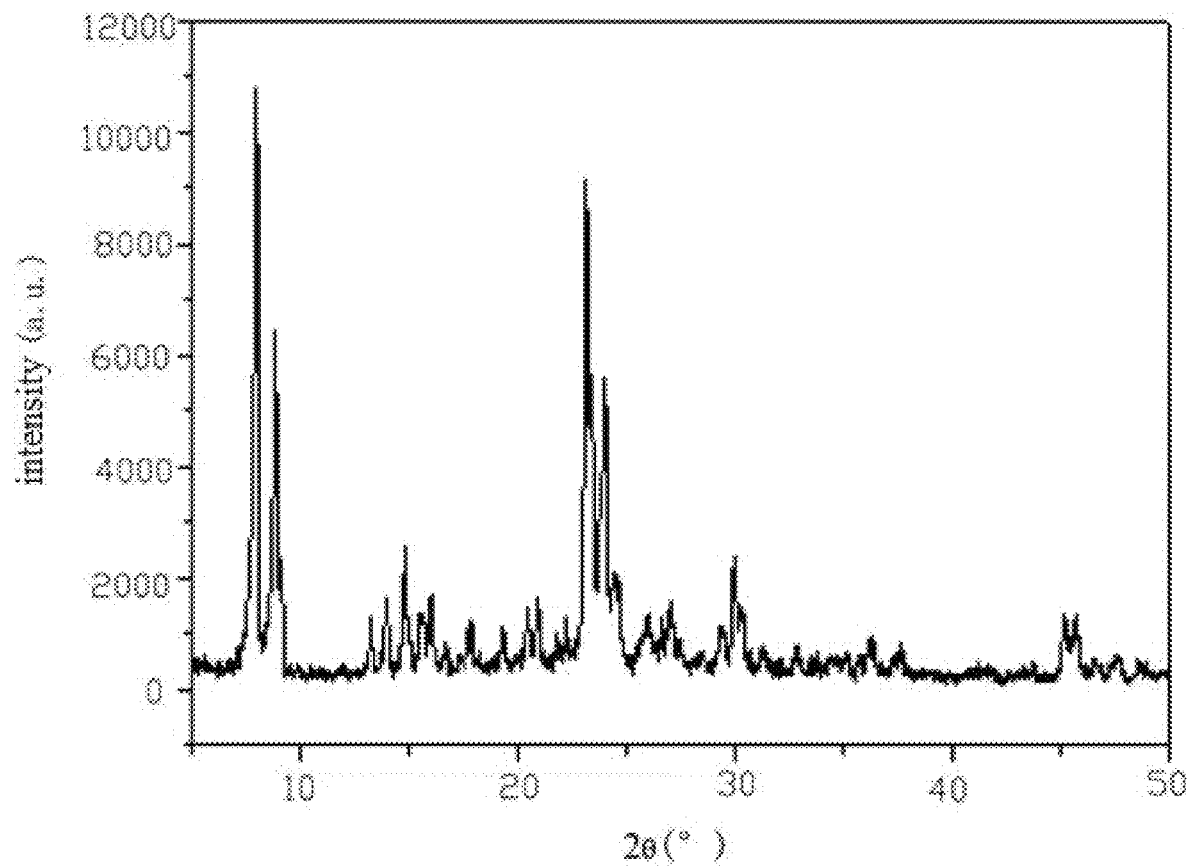
FIG. 8 is an XRD spectrum of example 1B.
Figure 10:
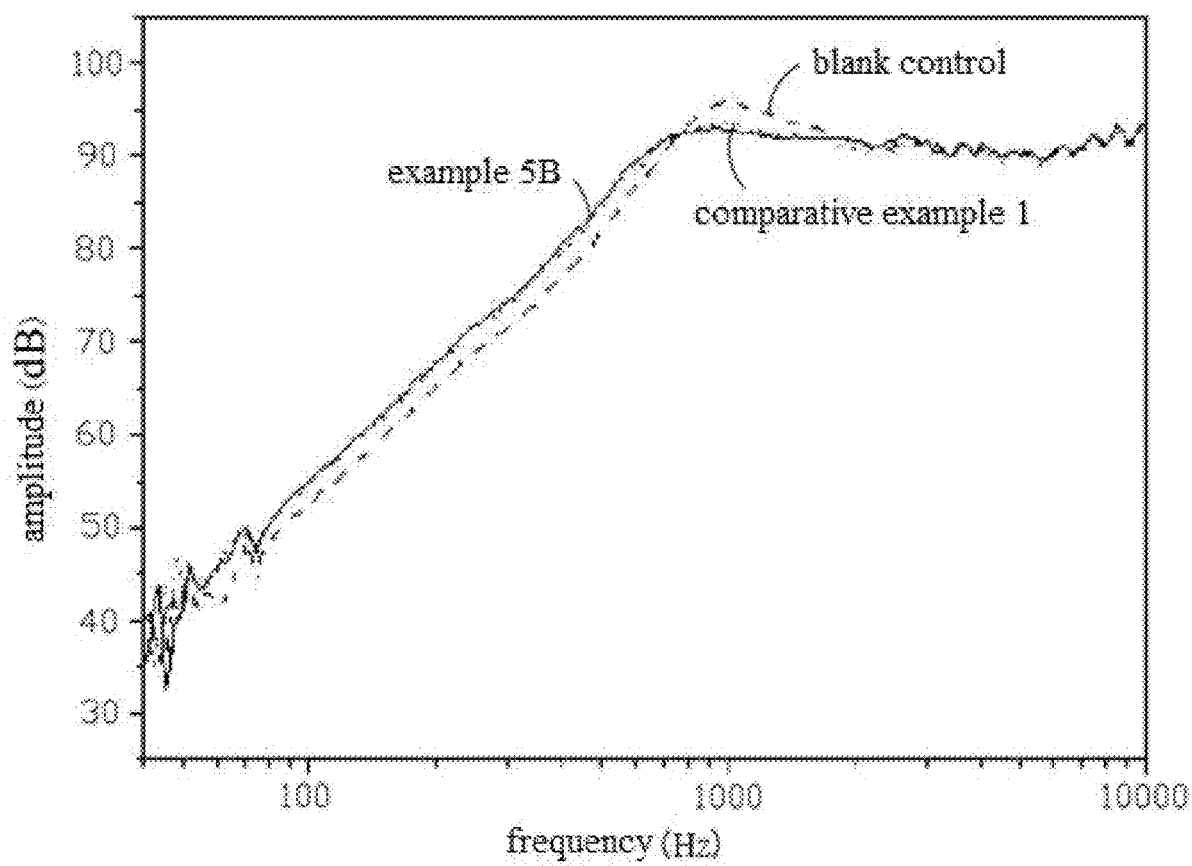
FIG. 10 is a curve of acoustic pressure frequency response according to comparative example 1 and example 5B of the present disclosure.

Example 1B provides a method for preparing the acoustic absorption material, an MFI-structure molecular sieve with a ratio of silicon and aluminum being 80 is synthesized by using silicon source, aluminum source, alkali source, template reagent and water. The template reagent is one or more of tetrapropyl ammonium bromide, tetrapropyl ammonium hydroxide, tetrapropyl ammonium chloride, tetrapropyl ammonium iodide and tetrapropyl ammonium fluoride. An XRD spectrum is shown in FIG. 8, and a curve of acoustic pressure frequency response is shown in FIG. 10.

Figure 9:
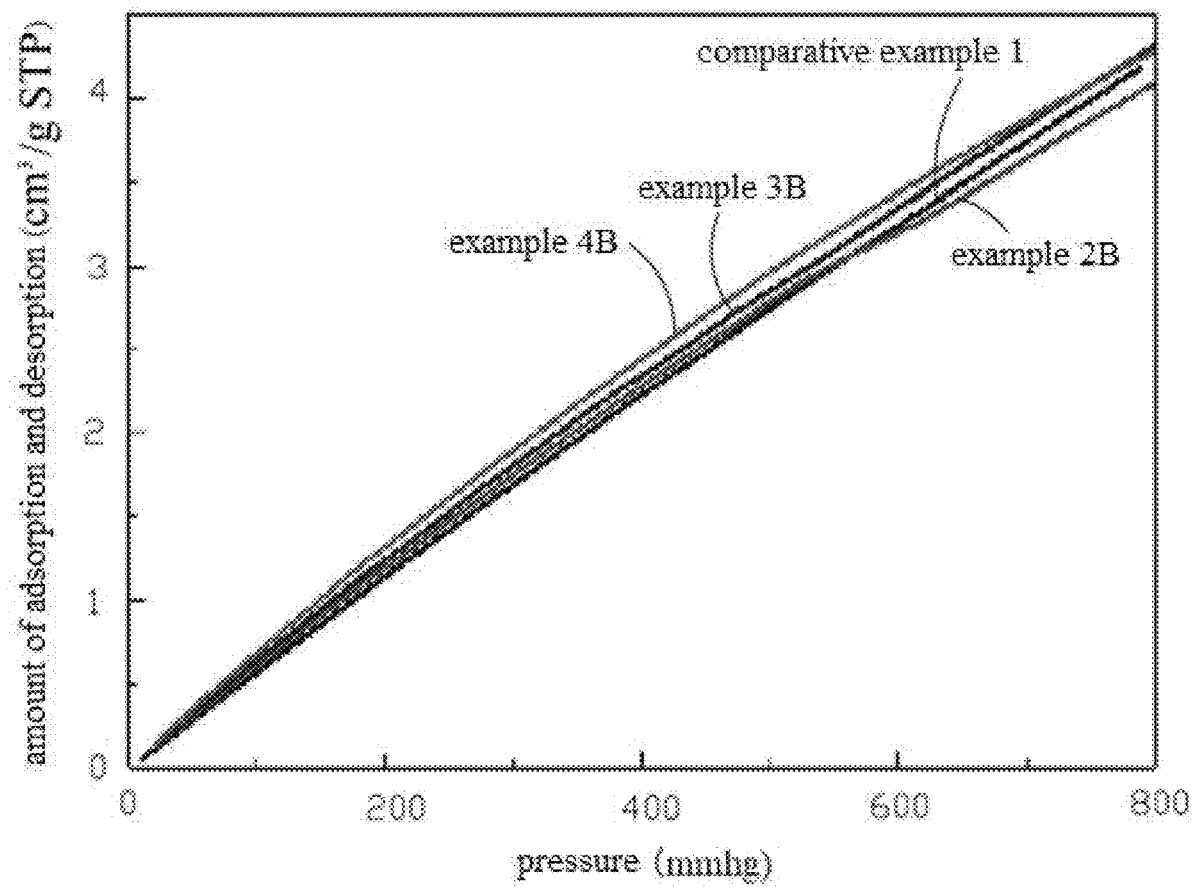
FIG. 9 is a curve of nitrogen adsorption amount changing with pressure at 25° C. according to example 2B, example 3B, example 4B and comparative example 1 of the present disclosure.

Example 2B provides another method for preparing the acoustic absorption material which is basically the same as example 1B except a main difference in that: an MFI-structure molecular sieve with a ratio of silicon and aluminum being 120 is synthesized. The normal-temperature nitrogen adsorption of the MFI-structure molecular sieve is shown in FIG. 9.

Example 3B provides another method for preparing the acoustic absorption material which is basically the same as example 1B except a main difference in that: an MFI-structure molecular sieve with a ratio of silicon and aluminum being 180 is synthesized. The normal-temperature nitrogen adsorption of the MFI-structure molecular sieve is shown in FIG. 9.

Example 4B provides another method for preparing the acoustic absorption material which is basically the same as the example 3B except a main difference in that: a silver type MFI-structure molecular sieve is obtained by performing silver nitrate exchange for an MFI-structure molecular sieve. The normal-temperature nitrogen adsorption of the silver type MFI-structure molecular sieve is shown in FIG. 9.

Example 5B provides another method for preparing the acoustic absorption material which is basically the same as the example 3B except a main difference in that: a sodium type MFI-structure molecular sieve is obtained by performing sodium salt exchange for an MFI-structure molecular sieve. It may be understood that the sodium salt may be at least one of sodium chloride, sodium sulfate, and sodium nitrate, which is not limited herein. The curve of acoustic pressure frequency response of the sodium type MFI-structure molecular sieve is shown in FIG. 10.

Example 6B provides another method for preparing the acoustic absorption material which is basically the same as the example 3B except a main difference in that: a potassium type MFI-structure molecular sieve is obtained by performing potassium salt exchange for an MFI-structure molecular sieve. It may be understood that the potassium salt may be at least one of potassium chloride, potassium sulfate, and potassium nitrate, which is not limited herein.

Example 7B provides another method for preparing the acoustic absorption material which is basically the same as the example 3B except a main difference in that: a lithium-potassium type MFI-structure molecular sieve is obtained by performing mixed exchange with a concentration ratio of potassium salt and lithium salt being 2:3 for an MFI-structure molecular sieve. It may be understood that the potassium salt may be at least one of potassium chloride, potassium sulfate, and potassium nitrate, and the lithium salt may be at least one of lithium chloride, lithium sulfate, and lithium carbonate, which is not limited herein.

Example 8B provides another method for preparing the acoustic absorption material which is basically the same as the example 2B except a main difference in that: a lithium type MFI-structure molecular sieve is obtained by performing lithium salt exchange for an MFI-structure molecular sieve. It may be understood that the lithium salt may be at least one of lithium chloride, lithium sulfate, and lithium carbonate, which is not limited herein.

Example 9B provides another method for preparing the acoustic absorption material which is basically the same as the example 2B except a main difference in that: a lithium-sodium-potassium type MFI-structure molecular sieve is obtained by performing mixed exchange with a concentration ratio of potassium salt, sodium salt and lithium salt being 1:1:1 for an MFI-structure molecular sieve. It may be understood that the sodium salt may be at least one of sodium chloride, sodium sulfate and sodium nitrate, the potassium salt may be at least one of potassium chloride, potassium sulfate, and potassium nitrate, and the lithium salt may be at least one of lithium chloride, lithium sulfate, and lithium carbonate, which is not limited herein.

Example 10B provides another method for preparing the acoustic absorption material which is basically the same as the example 2B except a main difference in that: a potassium type MFI-structure molecular sieve is obtained by performing potassium salt exchange for an MFI-structure molecular sieve three times. It may be understood that the potassium salt may be at least one of potassium chloride, potassium sulfate, and potassium nitrate, which is not limited herein.

Example 11B provides another method for preparing the acoustic absorption material which is basically the same as the example 3B except a main difference in that: a potassium-barium type MFI-structure molecular sieve is obtained by performing one potassium salt exchange and one barium salt exchange for an MFI-structure molecular sieve.

Comparative example 1 provides a method for preparing the acoustic absorption material which is basically the same as example 1B except a main difference in that: an MFI-structure molecular sieve with a ratio of silicon and aluminum being 350 is synthesized. The normal-temperature nitrogen adsorption of the MFI-structure molecular sieve is shown in FIG. 9, and the curve of acoustic pressure frequency response of the MFI-structure molecular sieve is shown in FIG. 10.

The molecular sieves synthesized by examples 1B-11B and comparative example 1 is mixed with a solvent, a binder and an auxiliary agent to prepare a suspended mixture which is dried and pulverized to obtain acoustic absorption material, respectively. Then, the material is filled into the rear cavity (tooling rear cavity is one cubic centimeter in volume, which is referred to 1 cc) of the speaker respectively to perform an acoustic performance test with results shown in Table 3 below.

TABLE 3

Resonant frequency $F_0$ and Q values before and after acoustic absorption material is added into the rear cavity of the speaker

| | 1 cc | | | | | | |
|---|---|---|---|---|---|---|---|
| | No acoustic absorption material is added into the rear cavity of the speaker | | 1 cc of acoustic absorption material is added | | Decrease value | | Moisture adsorption/% 25° C., 80% of |
| Sample | $F_0$ (Hz) | Q value | $F_0$ (Hz) | Q value | $\Delta F_0$ (Hz) | $\Delta Q$ value | moisture) |
| Example 1B | 921 | 1.5 | 750 | 0.6 | 171 | 0.9 | 5.6 |
| Example 2B | 920 | 1.5 | 680 | 0.7 | 240 | 0.8 | 4.2 |
| Example 3B | 919 | 1.5 | 665 | 0.7 | 254 | 0.8 | 2.8 |
| Example 4B | 920 | 1.5 | 655 | 0.7 | 265 | 0.8 | 2.1 |
| Example 5B | 920 | 1.5 | 653 | 0.7 | 267 | 0.8 | 1.9 |
| Example 6B | 918 | 1.5 | 652 | 0.7 | 266 | 0.8 | 1.9 |
| Example 7B | 918 | 1.5 | 653 | 0.7 | 265 | 0.8 | 1.9 |
| Example 8B | 919 | 1.5 | 650 | 0.7 | 269 | 0.8 | 1.9 |
| Example 9B | 918 | 1.5 | 662 | 0.7 | 256 | 0.8 | 1.9 |
| Example 10B | 919 | 1.5 | 669 | 0.7 | 250 | 0.8 | 2.2 |
| Example 11B | 919 | 1.5 | 656 | 0.7 | 263 | 0.8 | 2.0 |
| Comparative Example 1 | 919 | 1.5 | 667 | 0.7 | 252 | 0.8 | 1.8 |

In the present disclosure, an MFI-structure molecular sieve that is difficult to adsorb moisture and has a significantly increased amount of air in adsorption and desorption at room temperature is obtained by balancing a contradiction between the moisture adsorption and the electrostatic field action and selecting an appropriate synthesis and post-treatment manner. In this way, the molecular sieve has better effect of improving low frequency performance. The acoustic performance of low frequency band can be improved by each of the following manners: performing silver ion exchange for the MFI-structure molecular sieve (Example 4B), performing sodium ion exchange for the MFI-structure molecular sieve (Example 5B), performing potassium ion exchange for the MFI-structure molecular sieve (Example 6B), performing mixed exchange with a concentration ratio of potassium salt and lithium salt being 2:3 for the MFI-structure molecular sieve (Example 7B), performing lithium ion exchange for the MFI-structure molecular sieve (Example 8B), performing mixed exchange with a concentration ratio of potassium salt, sodium salt and lithium salt being 1:1:1 for the MFI-structure molecular sieve (Example 9B), performing three potassium ion exchanges for the MFI-structure molecular sieve (Example 10B), and performing one potassium ion exchange and one barium ion exchange for the MFI-structure molecular sieve (Example 11B). The effects of improvement in Examples 4B to 8B are better than those of in Examples 9B and 10B.

In one non-limiting embodiment of the present disclosure provides another acoustic absorption material, comprising a molecular sieve 10 having an MFI structure, which includes a framework and an off-framework cation, the framework includes $SiO_2$ and a metal oxide $M_xO_y$, a molar ratio of Si/M in the framework is at least 50 with M including Boron (B), and the off-framework cation is at least one of hydrogen ion, alkali metal ion and alkaline earth metal ion. For details of the molecular sieve 10 refer to the above description and will not described herein again.

Figure 11:
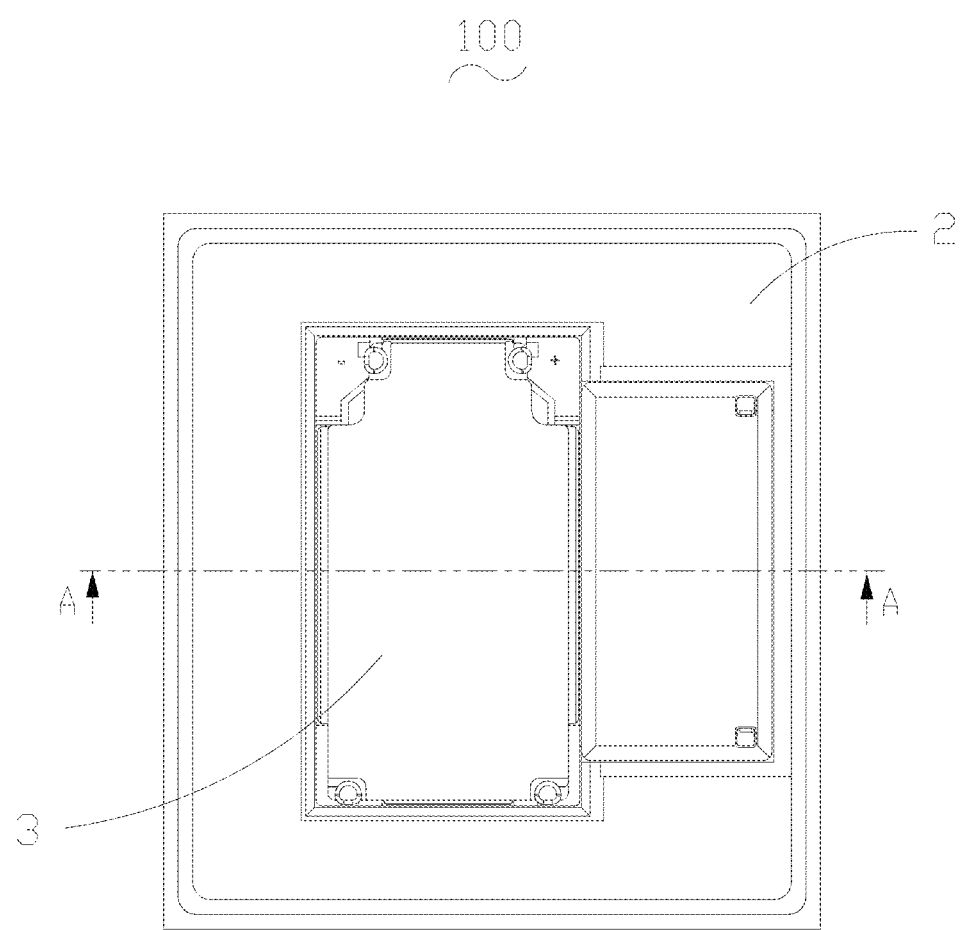
FIG. 11 is a top view illustrating an assembly structure of a speaker box according to an embodiment of the present disclosure.
Figure 12:
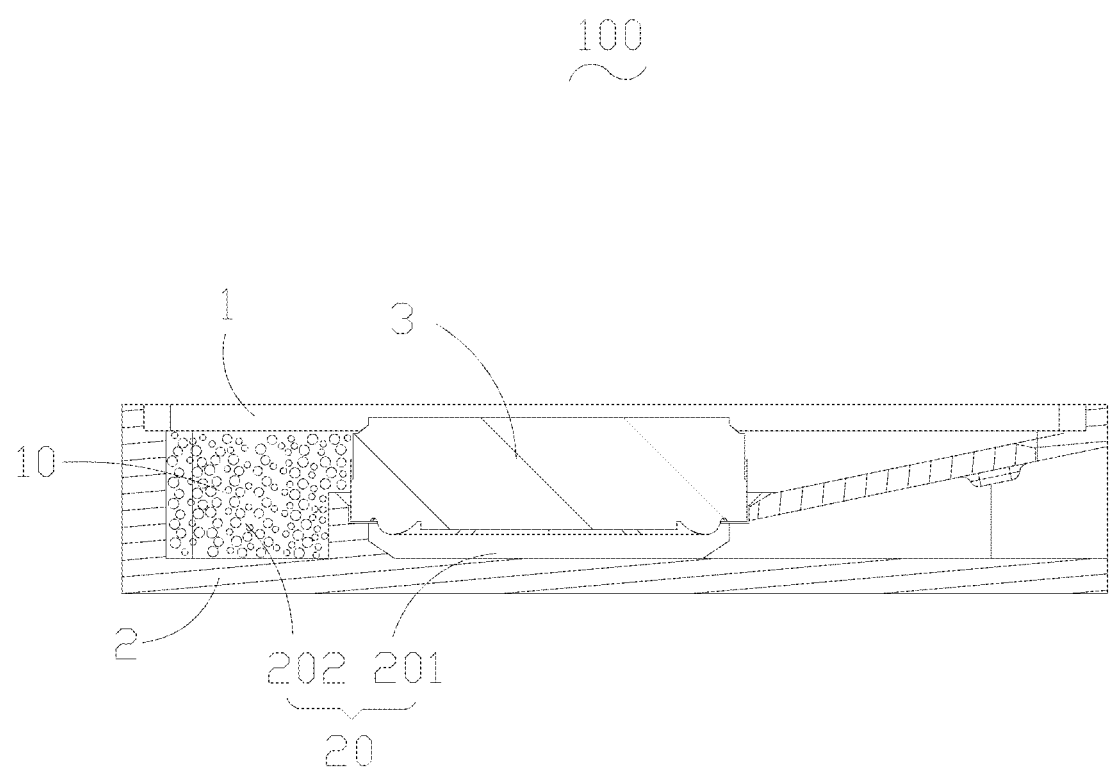
FIG. 12 is a sectional view taken along the direction of A-A in FIG. 11.

In another embodiment of the present disclosure provides a speaker box 100. As shown in FIGS. 11 and 12, the speaker box 100 includes an upper cover plate 1, a lower cover plate assembled with the upper cover plate 1 to form a receiving space 20, a sound-generating single body 3 received in the receiving space 20. The sound-generating single body 3 divides the receiving space 20 into a front cavity 201 and a rear cavity 202, the lower cover plate 2 and a sound-generating side of the sound-generating single body 3 spaced form a front cavity 201, a sound-out channel connecting the front cavity 201 with an external is formed between the upper cover plate 1 and the lower cover plate 2, the rear cavity 202 is filled with an acoustic absorption material and the acoustic absorption material comprises the molecular sieve 10 described above. Since the embodiment is an application embodiment corresponding to the molecular sieve 10 embodiment described above, then the embodiment has the same technical effects as the molecular sieve 10 embodiment, which will not be described herein.

Figure 13:
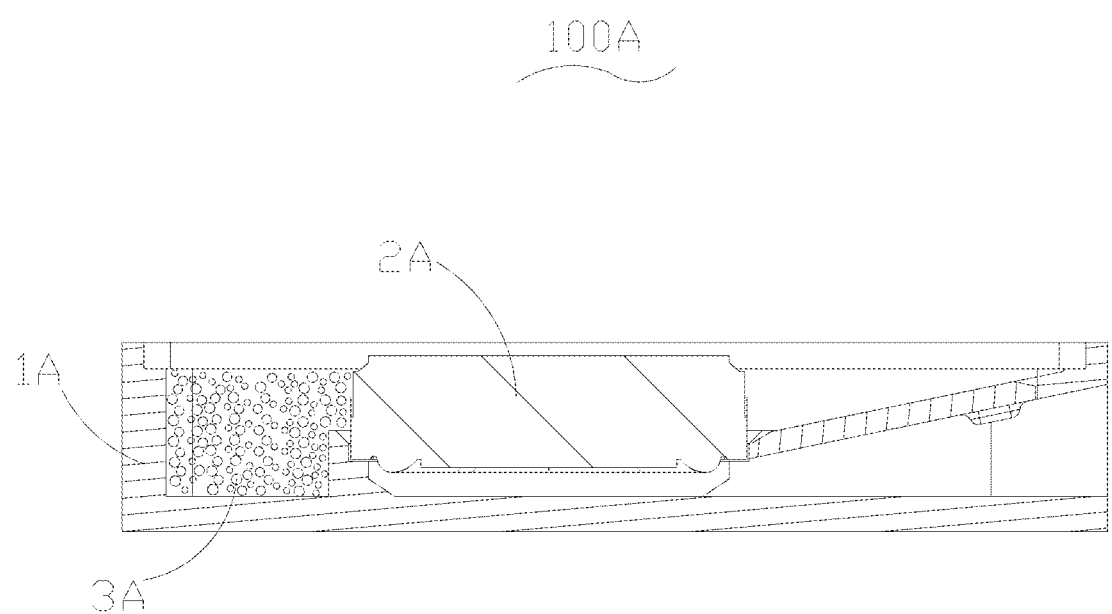
FIG. 13 is a schematic diagram illustrating a structure of a speaker according to another embodiment of the present disclosure.

In another embodiment of the present disclosure provides a speaker 100A, as shown in FIG. 13. The speaker 100A includes a shell 1A with a receiving space, a sound-generating single body 2A placed in the shell 1A and a rear cavity 3A enclosed by the sound-generating single body 2A and the shell 1A. The above acoustic absorption material is filled into the rear cavity 3A to increase acoustic compliance of air in the rear cavity, thereby improving low frequency performance of the speaker.

Those skilled in the art may understand that the above examples are merely specific examples of the present disclosure. Different modification and changes may be made in form and details during an actual application without departing from the spirit and scope of the present disclosure.

What is claimed is:

1. A molecular sieve having an MFI-structure, comprising a framework and an off-framework cation, wherein the framework comprises $SiO_2$ and a metal oxide $M_xO_y$ with M comprises boron (B), gallium (Ga) or aluminium (Al); the off-framework cation is at least one of hydrogen ion, alkali metal ion and alkaline earth metal ion; wherein
the atomic ratio of Si/M in the framework is at least 50 when M comprises boron, and wherein M also comprises zirconium,
the atomic ratio of Si/M in the framework is at least 100 when M comprises gallium, and wherein M also comprises zirconium,
the atomic ratio of Si/M in the framework is between 50 and 200 when M comprises aluminium, and wherein M also comprises zirconium.

2. The molecular sieve according to claim 1, wherein M also comprises trivalent and/or tetravalent metal ion in addition to boron and zirconium, gallium and zirconium or aluminium and zirconium.

3. The molecular sieve according to claim 2, wherein M also comprises at least one of titanium, iron and aluminium in addition to boron and zirconium.

4. The molecular sieve according to claim 3, wherein a molar ratio of silicon and boron in the framework is greater than 100.

5. The molecular sieve according to claim 2, wherein M also comprises at least one of aluminium, chromium, iron, nickel, titanium and germanium in addition to gallium and zirconium.

6. The molecular sieve according to claim 5, wherein a molar ratio of silicon and gallium in the framework is greater than 200.

7. The molecular sieve according to claim 2, wherein M also comprises at least one of chromium, iron, boron, titanium and germanium in addition to aluminum and zirconium.

8. The molecular sieve according to claim 7, wherein a molar ratio of silicon and aluminum in the framework is between 80 and 200.

9. The molecular sieve according to claim 1, wherein the particle size of the molecular sieve is greater than 10 nanometres.

10. The molecular sieve according to claim 9, wherein the particle size of the molecular sieve is less than 10 micrometers.

11. The molecular sieve according to claim 1, wherein the molecular sieve having an MFI-structure comprises a pure phase MFI-structure molecular sieve or a mixed phase MFI-structure molecular sieve.

12. The molecular sieve according to claim 1, wherein the molecular sieve having an MFI-structure is a pure phase MFI structure molecular sieve.

13. A method for preparing the molecular sieve according to claim 1, comprising steps of: performing synthesis by taking a corresponding ratio of silicon source, alkali, template reagent, M source and water; sintering to form an MFI-structure molecular sieve with microspores; and adding a binder to form a granulated molecular sieve.

14. The method for preparing the molecular sieve according to claim 13, wherein the template reagent is one or more of organic amine, organic ammonium salt and organic base.

15. An acoustic absorption material, comprising a molecular sieve according to claim 1.

16. A method for preparing the acoustic absorption material according to claim 15, comprising the following steps: a molecular sieve having an MFI-structure is synthesized by taking a corresponding ratio of silicon source, alkali source, template reagent, M source and water; separating and washing by a centrifuge to obtain the molecular sieve having an MFI-structure and a template reagent is removed by calcination; then the molecular sieve having an MFI-structure is moulded together with a binder, a solvent, and an auxiliary agent into particles with a predetermined size.

17. The method for preparing the acoustic absorption material according to claim 16, wherein the template reagent is one or more of organic amine, organic ammonium salt or organic base.

18. A speaker box, comprising an upper cover plate, a lower cover plate assembled with the upper cover plate to form a receiving space, a sound-generating single body received in the receiving space, wherein the sound-generating single body divides the receiving space into a front cavity and a rear cavity, the rear cavity is filled with the acoustic absorption material according to claim 15.

19. A speaker, comprising a shell with a receiving space, a sound-generating single body placed in the shell, and a rear cavity enclosed by the sound-generating single body and the shell, wherein the rear cavity is filled with the acoustic absorption material according to claim 15.

\* \* \* \* \*